US012705274B2

(12) United States Patent
Dar et al.

(10) Patent No.: US 12,705,274 B2
(45) Date of Patent: Aug. 11, 2026

(54) SYSTEM AND METHOD FOR GENERATING SYMMETRIC SEARCHES FOR RETRIEVAL AUGMENTED GENERATION USING CHUNK SUMMARIES

(71) Applicant: Dell Products L.P., Round Rock, TX (US)

(72) Inventors: Shaul Dar, Petach Tikva (IL); Ramakanth Kanagovi, Hyderabad (IN); Guhesh Swaminathan, Chennai (IN); Rajan Kumar, Nawada (IN); Ophir Jehoshua Buchman, Ra'anana (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/680,512

(22) Filed: May 31, 2024

(65) Prior Publication Data

US 2025/0371062 A1 Dec. 4, 2025

(51) Int. Cl.
*G06F 16/355* (2025.01)
*G06F 16/334* (2025.01)
*G06F 16/34* (2025.01)

(52) U.S. Cl.
CPC .......... *G06F 16/355* (2019.01); *G06F 16/334* (2019.01); *G06F 16/345* (2019.01)

(58) Field of Classification Search
CPC ..... G06F 16/355; G06F 16/334; G06F 16/345
USPC .......... 707/738
See application file for complete search history.

(56) References Cited

U.S. PATENT DOCUMENTS 10,896,297 B1 * 1/2021 Tory .......... G06F 40/289
2015/0179168 A1 * 6/2015 Hakkani-Tur .......... G10L 15/22 704/257
2017/0161258 A1 * 6/2017 Astigarraga .......... G06Q 10/10
2021/0049923 A1 * 2/2021 Brinton .......... G09B 7/00
2022/0310070 A1 * 9/2022 Moritz .......... G10L 15/28
2024/0289863 A1 * 8/2024 Smith Lewis .......... G06N 3/008
2024/0386253 A1 * 11/2024 White, Jr. .......... G06F 40/166
2025/0086215 A1 * 3/2025 Kumar .......... G06F 16/345
2025/0094688 A1 * 3/2025 Aggarwal .......... G06F 40/30
2025/0131289 A1 * 4/2025 Larson .......... G06N 5/02
2025/0165463 A1 * 5/2025 Brenner .......... G06F 16/242

* cited by examiner

*Primary Examiner* — Cam Linh T Nguyen
(74) *Attorney, Agent, or Firm* — Brian J. Colandreo; Heath M. Sargeant; Holland & Knight LLP

(57) ABSTRACT

A method, computer program product, and computing system for generating a plurality of chunks for a plurality of text portions of a document. A plurality of chunk summaries are generated by generating a summary for each respective chunk of the plurality of chunks. A plurality of chunk summary embeddings are generated by generating an embedding of the summary for each respective chunk. The plurality of chunk summary embeddings are provided for processing a query using the generative AI model.

12 Claims, 6 Drawing Sheets

SYSTEM AND METHOD FOR GENERATING SYMMETRIC SEARCHES FOR RETRIEVAL AUGMENTED GENERATION USING CHUNK SUMMARIES

BACKGROUND

Generative artificial intelligence (AI) models, such as Large Language Model (LLMs)s have recently proven to be a better alternative to traditional search engines, helping users find pieces of information they are looking for, and able to provide more concise and relevant answers, albeit with a risk that the answers may be irrelevant or incorrect.

In some instances, the query that a user types is given as input to the LLM, along an appropriate context, which is the text that the LLM should "search" for in an answer, a technique that is called prompt engineering. The main problem with this approach is that the size of the prompt is limited. For example, the limit for GPT3.5-Turbo is 4,096 tokens, the limit for GPT4 is 8,192 tokens, and the limit for GPT-4-32k is 32,768 tokens. Documents or other content that can be searched using the LLM are often orders of magnitude larger than the prompt size limit. For example, the size of a single example storage system user guide is twenty megabytes, and the size of the complete set of relevant installation documents and knowledge base articles ranges between hundreds of megabytes to hundreds of gigabytes. Accordingly, Retrieval Augmented Generation (RAG) is used to break input documents into chunks that are small enough to fit the prompt size limitations. It then uses common indexing and retrieval techniques to match user queries to the most relevant content chunks, and then combines the user query and context (one or more chunks) as a prompt to the LLM and presents the answers to the user.

In practice when the RAG methodology is used, the results are often disappointing. The answers provided by the LLM may be wrong or irrelevant, phrased incorrectly, or even "made up" (hallucinations). The main reasons are a bad chunking methodology and/or a poor match between the query and chunks, causing the context presented to the LLM to be based on incorrect content chunks, resulting in wrong answers. Thus, the information retrieval stage, namely effective chunking, chunk indexing, and the similarity search for a small set of chunks (out of thousands and potentially millions) that are the best match for a given query may have a much greater impact on query processing performance than the final LLM stage.

SUMMARY OF DISCLOSURE

In one example implementation, a computer-implemented method executed on a computing device may include, but is not limited to, generating a plurality of chunks for a plurality of text portions of a document. A plurality of chunk summaries are generated by generating a summary for each respective chunk of the plurality of chunks. A plurality of chunk summary embeddings are generated by generating an embedding of the summary for each respective chunk. The plurality of chunk summary embeddings are provided for processing a query using the generative AI model.

One or more of the following example features may be included. Generating the plurality of chunk summaries may include extracting the chunk summary from the document structure. Generating the plurality of chunk summaries may include performing topic extraction on each chunk to generate the chunk summary. Generating the plurality of chunk summaries may include performing chunk summarization using a generative AI model. Generating the plurality of chunks may include performing topic extraction on the plurality of text portions of the document. Generating the plurality of chunks may include generating a new chunk in response to detecting a change in topic for a topic extracted from a text portion of the document. A query embedding may be generated from the query. A candidate chunk may be identified by determining a similarity between the query embedding and the plurality of chunk summary embeddings. A prompt may be generated using the query and the candidate chunk. The prompt may be provided to the generative AI model.

In another example implementation, a computer program product resides on a computer readable medium that has a plurality of instructions stored on it. When executed by a processor, the instructions cause the processor to perform operations that may include, but are not limited to, generating a plurality of chunks for a plurality of text portions of a document. A plurality of chunk summaries are generated by generating a summary for each respective chunk of the plurality of chunks. A plurality of chunk summary embeddings are generated by generating an embedding of the summary for each respective chunk. The plurality of chunk summary embeddings are provided for processing a query using the generative AI model.

One or more of the following example features may be included. Generating the plurality of chunk summaries may include extracting the chunk summary from the document structure. Generating the plurality of chunk summaries may include performing topic extraction on each chunk to generate the chunk summary. Generating the plurality of chunk summaries may include performing chunk summarization using a generative AI model. Generating the plurality of chunks may include performing topic extraction on the plurality of text portions of the document. Generating the plurality of chunks may include generating a new chunk in response to detecting a change in topic for a topic extracted from a text portion of the document. A query embedding may be generated from the query. A candidate chunk may be identified by determining a similarity between the query embedding and the plurality of chunk summary embeddings. A prompt may be generated using the query and the candidate chunk. The prompt may be provided to the generative AI model.

In another example implementation, a computing system includes at least one processor and at least one memory architecture coupled with the at least one processor, wherein the at least one processor is configured to generate a plurality of chunks for a plurality of text portions of a document. A plurality of chunk summaries are generated by generating a summary for each respective chunk of the plurality of chunks. A plurality of chunk summary embeddings are generated by generating an embedding of the summary for each respective chunk. The plurality of chunk summary embeddings are provided for processing a query using the generative AI model.

One or more of the following example features may be included. Generating the plurality of chunk summaries may include extracting the chunk summary from the document structure. Generating the plurality of chunk summaries may include performing topic extraction on each chunk to generate the chunk summary. Generating the plurality of chunk summaries may include performing chunk summarization using a generative AI model. Generating the plurality of chunks may include performing topic extraction on the plurality of text portions of the document. Generating the plurality of chunks may include generating a new chunk in response to detecting a change in topic for a topic extracted from a text portion of the document. A query embedding may be generated from the query. A candidate chunk may be identified by determining a similarity between the query embedding and the plurality of chunk summary embeddings. A prompt may be generated using the query and the candidate chunk. The prompt may be provided to the generative AI model.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
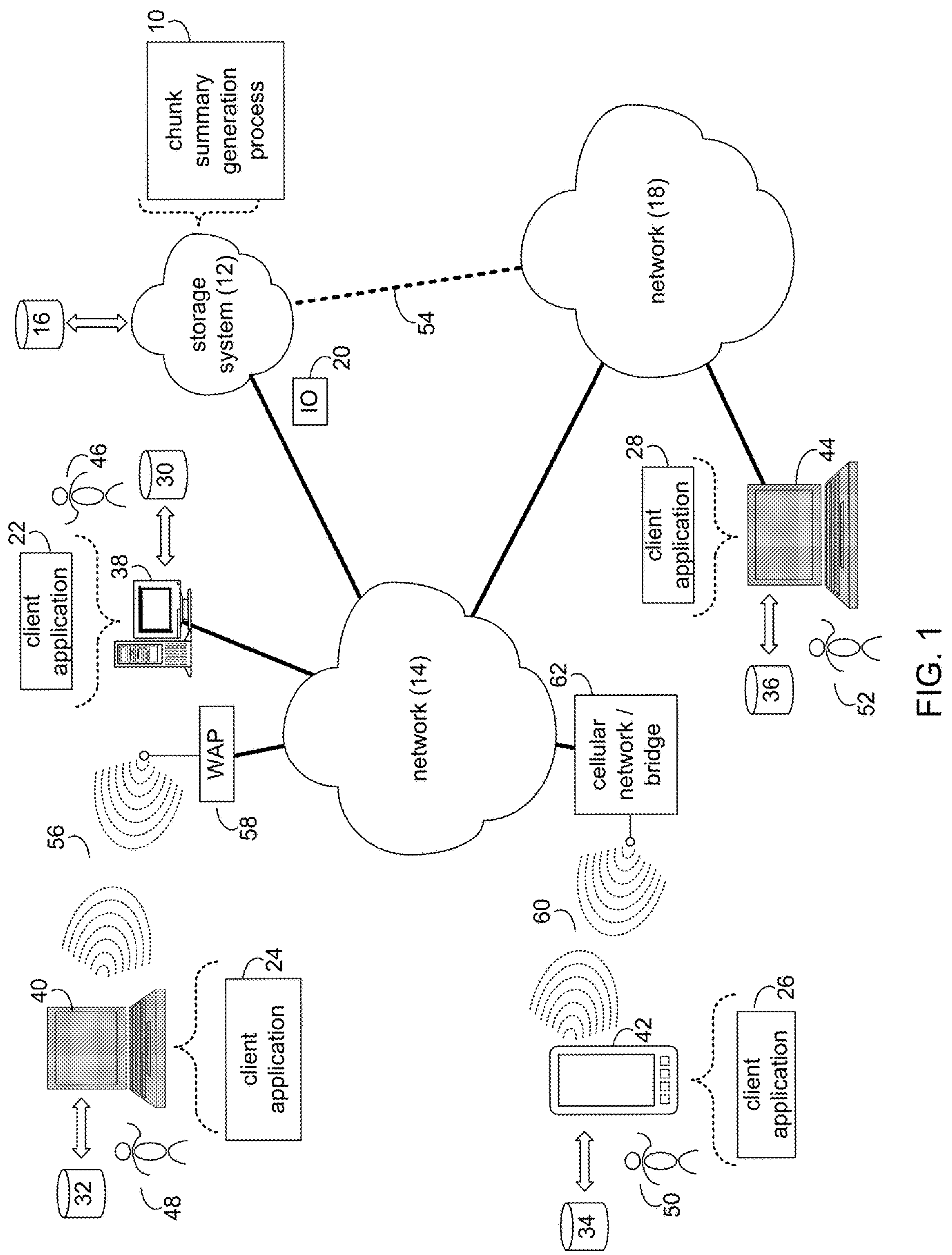
FIG. 1 is an example diagrammatic view of a storage system and a chunk summary generation process coupled to a distributed computing network according to one or more example implementations of the disclosure.

Referring to FIG. 1, there is shown chunk summary generation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device, and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of chunk summary generation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of chunk summary generation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a chunk summary generation process, such as chunk summary generation process 10 of FIG. 1, may include but is not limited to, generating a plurality of chunks for a plurality of text portions of a document. A plurality of chunk summaries are generated by generating a summary for each respective chunk of the plurality of chunks. A plurality of chunk summary embeddings are generated by generating an embedding of the summary for each respective chunk. The plurality of chunk summary embeddings are provided for processing a query using the generative AI model.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
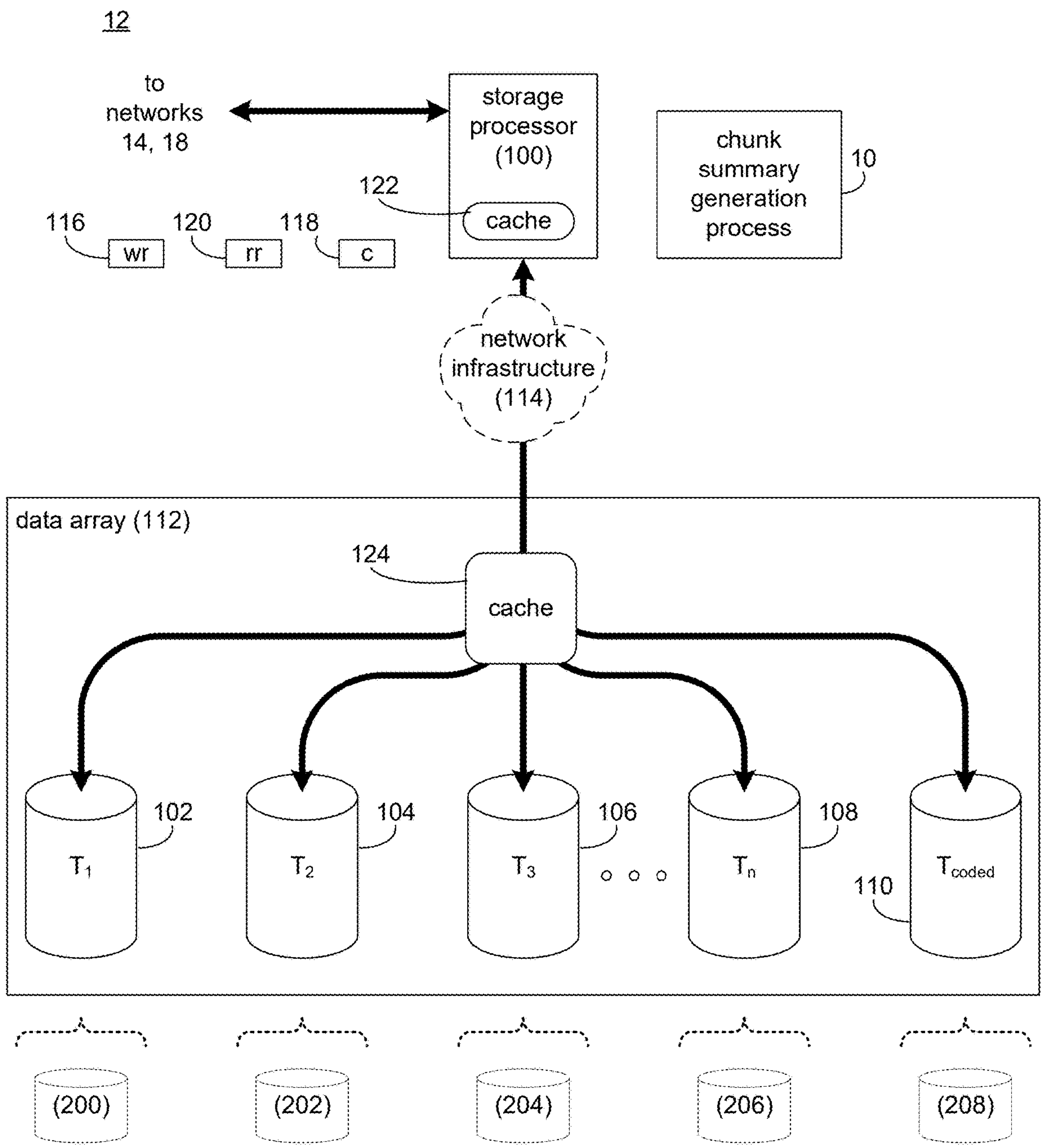
FIG. 2 is an example diagrammatic view of the storage system of FIG. 1 according to one or more example implementations of the disclosure.
Figure 3:
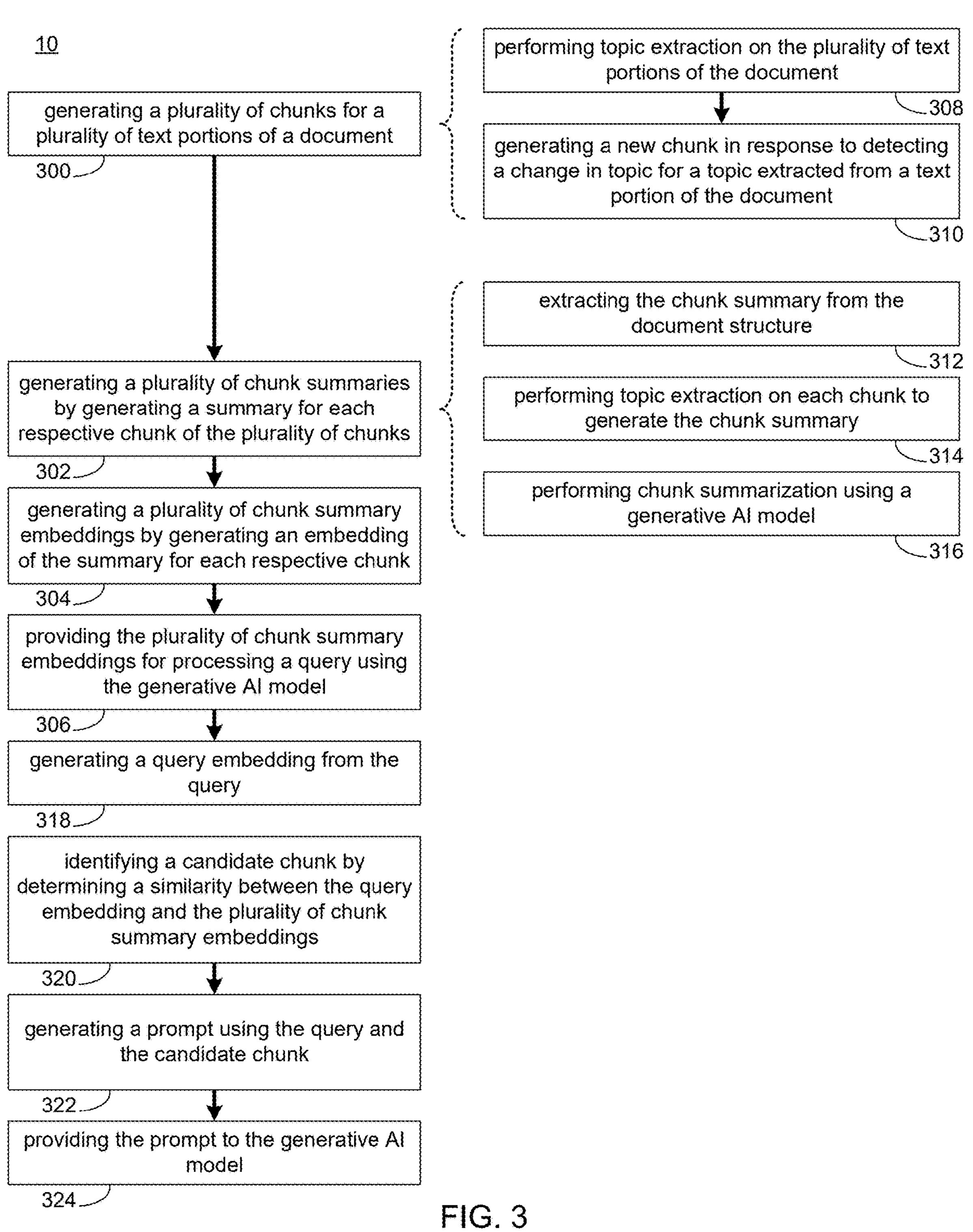
FIG. 3 is an example flowchart of chunk summary generation process according to one or more example implementations of the disclosure.

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g., the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g., the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of chunk summary generation process 10. The instruction sets and subroutines of chunk summary generation process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of chunk summary generation process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e., a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g., one or more of storage targets 102, 104, 106, 108, and coded target 110.

As discussed above, the instruction sets and subroutines of chunk summary generation process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of chunk summary generation process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Chunk Summary Generation Process

Referring also to the examples of FIGS. 3-6 and in some implementations, chunk summary generation process 10 may generate 300 a plurality of chunks for a plurality of text portions of a document. A plurality of chunk summaries are generated 302 by generating a summary for each respective chunk of the plurality of chunks. A plurality of chunk summary embeddings are generated 304 by generating an embedding of the summary for each respective chunk. The plurality of chunk summary embeddings are provided 306 for processing a query using the generative AI model.

Figure 4:
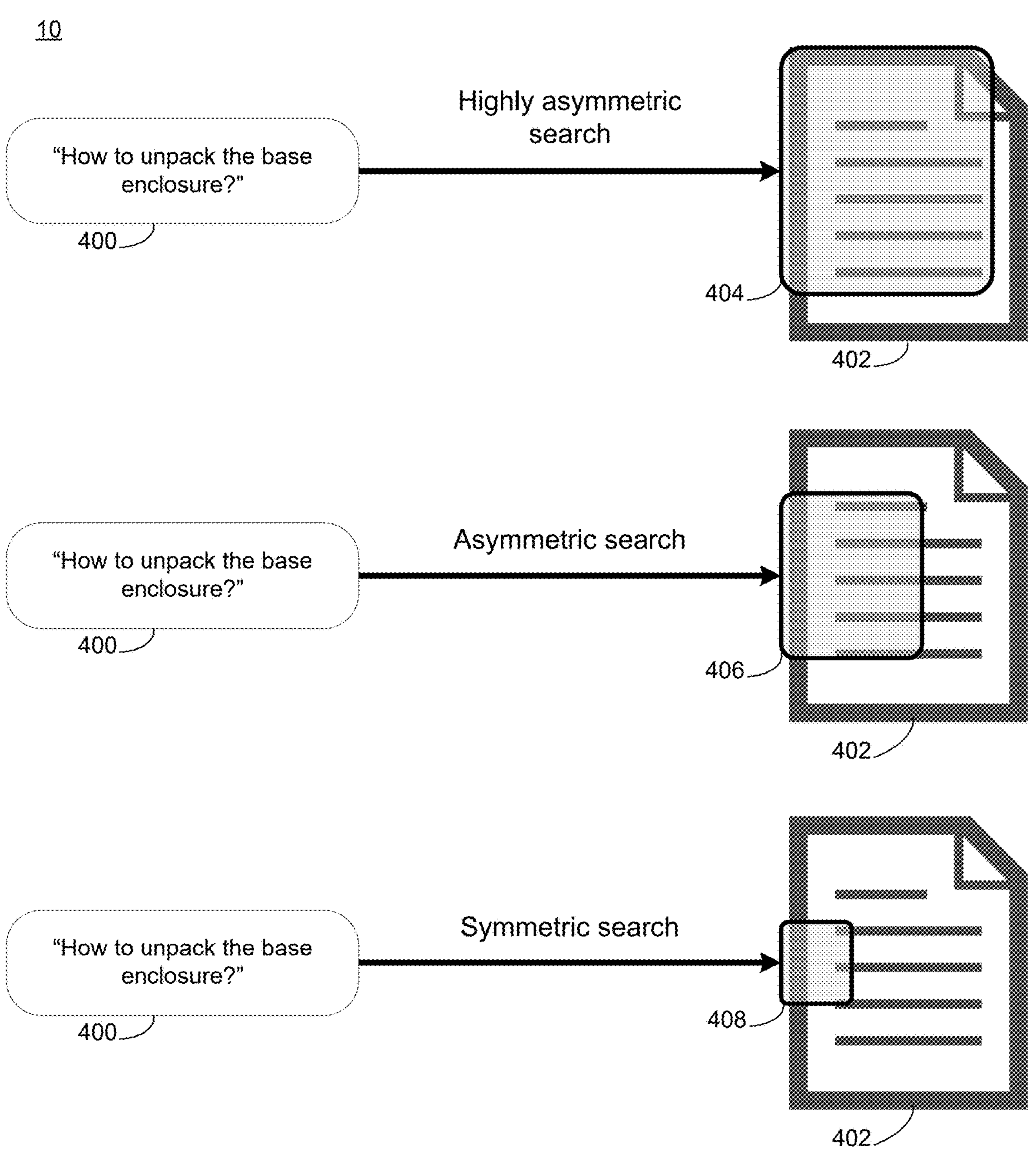
FIG. 4 is an example diagrammatic view of a highly asymmetric search, an asymmetric search, and a symmetric search of a query relative to varying sized chunks according to one or more example implementations of the disclosure.

As will be discussed in greater detail below, implementations of the present disclosure may allow for optimized chunking of input documents to enhance RAG performance with a generative AI model. For example, performing a similarity search between a short query and a large text chunk may not work very well. This is known in information retrieval as "asymmetric search." In general, it is advisable to match two pieces of text of equivalent size, and the best match is achieved between two short pieces of text as shown in FIG. 4. For example, suppose query 400 includes the request "How to unpack the base enclosure?" which is thirty-three characters. In this example, suppose document 402 is chunked with a large chunk (e.g., chunk 404) which includes about ten-thousand characters. This results in a highly asymmetric search (i.e., thirty-three characters compared to ten-thousand characters). Now, suppose document 402 is chunked with a medium chunk (e.g., chunk 406) which includes about one-thousand characters. This results in an asymmetric search (i.e., thirty-three characters compared to one-thousand characters). Now, suppose document 402 is chunked with a small chunk (e.g., chunk 408) which includes about fifty characters. This results in a symmetric search (i.e., thirty-three characters compared to fifty characters). Accordingly, chunk summary generation process 10 provides different approaches to semantically "compress" large chunks of text into much smaller "synopses" that capture the essence of the information in the text chunks, allowing for a more symmetric, and as a result more accurate, match between the user query and the chunk synopsis.

In some implementations, chunk summary generation process 10 generates 300 a plurality of chunks for a plurality of text portions of a document. A chunk is a discrete portion of the document that is used to generate a chunk embedding for combination with a query embedding to provide content in a prompt provided to a generative AI model during RAG. Generating 300 the plurality of chunks includes generating an index or indexes for searching during query processing. As such, each generated chunk may be stored in a database or other data structure as an index. In some implementations, a generative AI model is a type of artificial intelligence system that is capable of generating new data samples that are similar to the training data it has been trained with. These models work by learning the underlying patterns and structures present in the training data and then using this "knowledge", they generate new, consistent examples.

In some implementations, the generative AI model includes a Large Language Model (LLM). A LLM (e.g., GPT-4 from OpenAI®, OpenLLaMa, and Cerebras-GPT) is a language model consisting of a neural network with many parameters (typically billions of weights or more), trained on large quantities of unlabeled text using self-supervised learning or semi-supervised learning. Though trained on simple tasks along the lines of predicting the next word in a sentence, LLMs with sufficient training and parameter counts capture the syntax and semantics of human language. In some implementations, the generative AI model includes a natural language processing (NLP) model. An NLP model (e.g., XLNet, Robustly Optimized Bidirectional Encoder Representations from Transformers Pretraining Approach (RoBERTa), and Pathways Language Model (PaLM)) is a model that concerns the understanding, analysis, and generation of natural language. NLP models analyze text and speech to extract meaning, as well as generating new text or speech in response.

Figure 5:
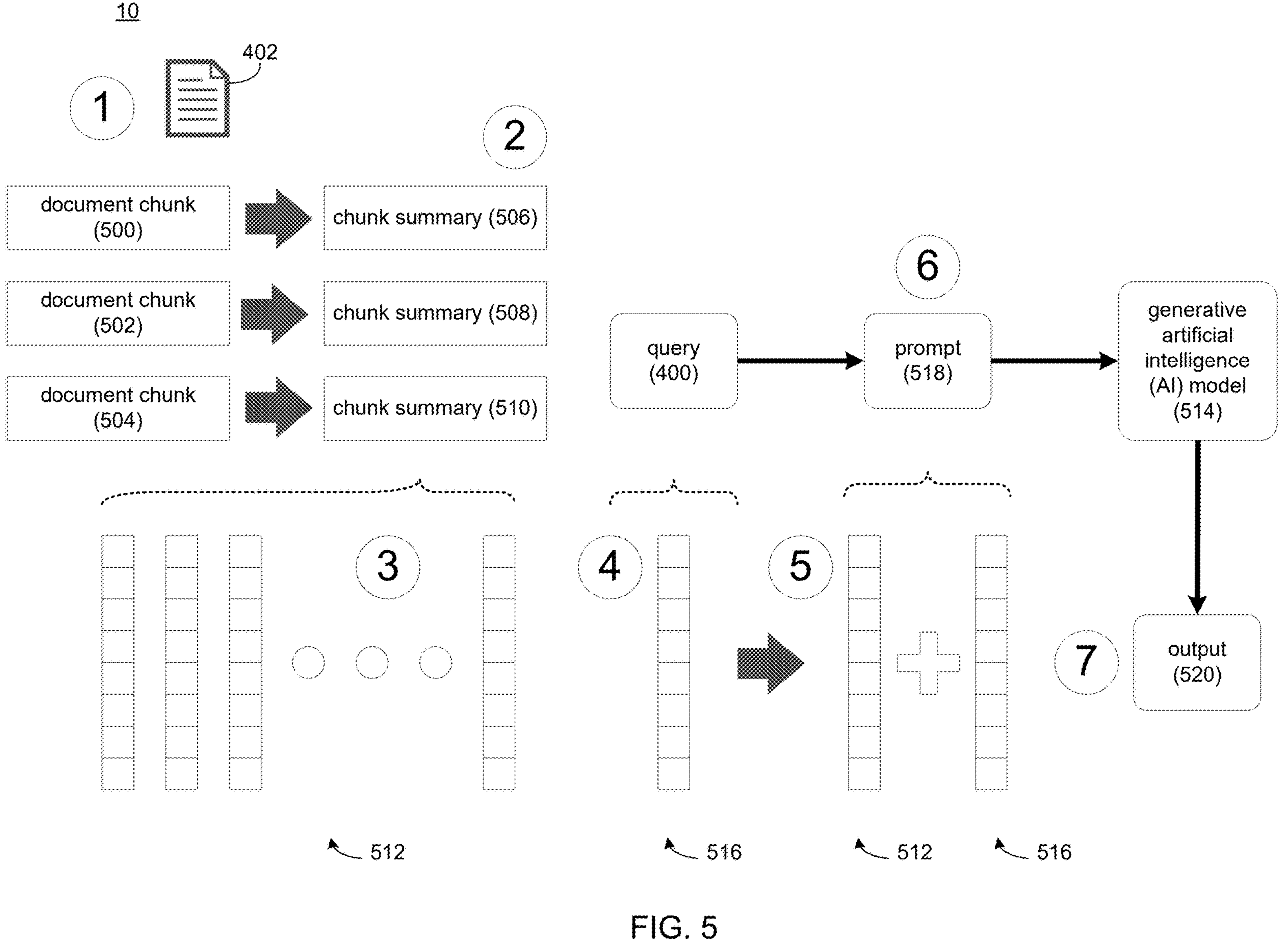
FIG. 5 is an example diagrammatic view of a retrieval augmented generation (RAG) process according to one or more example implementations of the disclosure.
Figure 6:
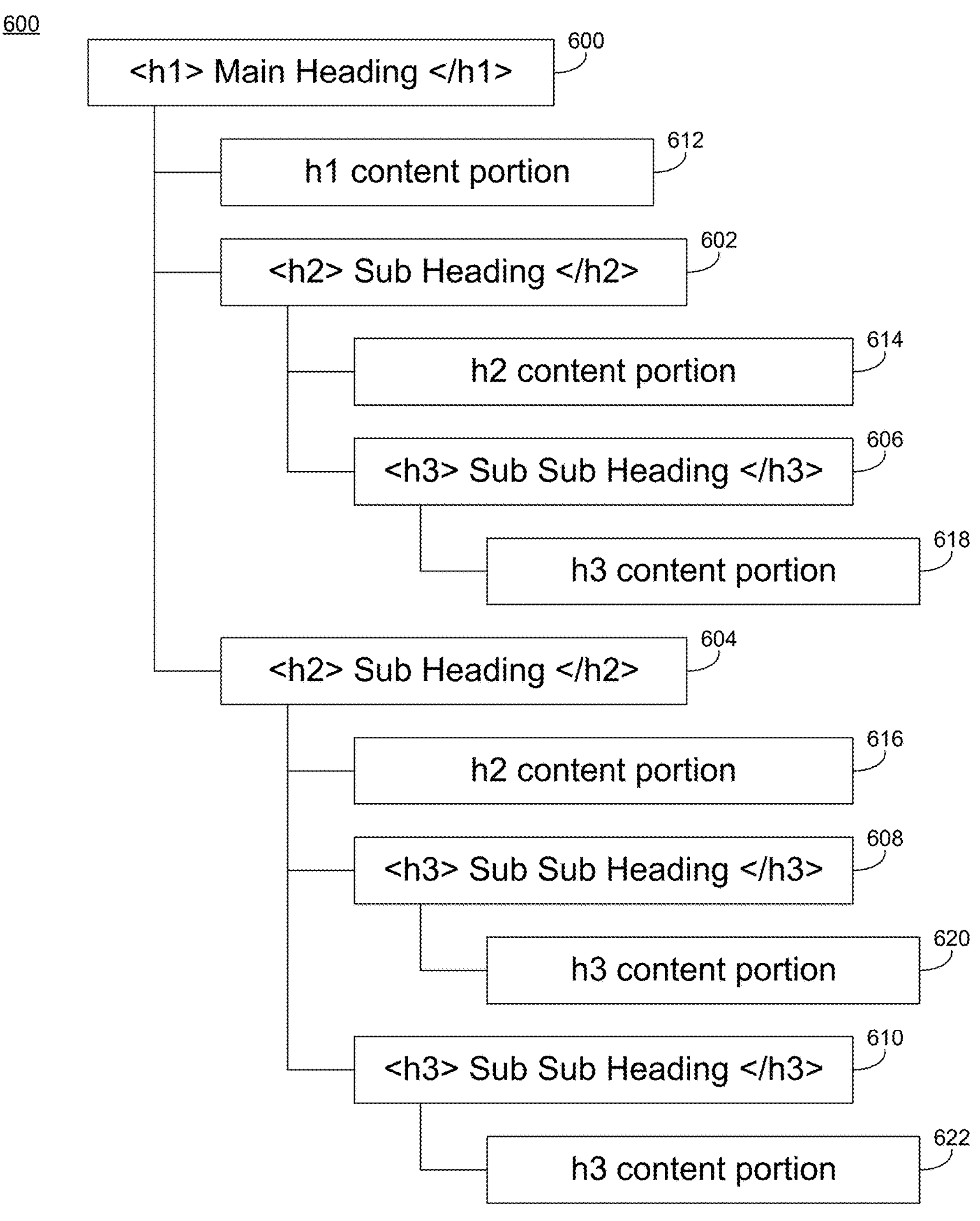
FIG. 6 is an example diagrammatic view of the hierarchical structure of a document from which topics may be extracted to generate chunk summaries according to one or more example implementations of the disclosure.

As discussed above, many generative AI models, such as LLMs, are not trained on a particular library of input documents used for a particular scenario. As such, these generative AI models lack the context to process content from the library of input documents. Accordingly, the process of Retrieval Augmented Generation (RAG) is used to break the relevant input documents into chunks that are small enough to fit prompt size limitations associated with the generative AI model. Referring also to FIG. 5, chunk summary generation process 10 generates 300 a plurality of chunks for use during retrieval augmented generation (RAG). In some implementations, chunk summary generation process 10 is a preprocessing phase of RAG used to prepare chunk embeddings for use during RAG to generate prompts. As shown in FIG. 5 and when preparing an input document for retrieval augmented generation (RAG), chunk summary generation process 10 processes a collection of input documents (e.g., document 402) and breaks each input document into chunks (e.g., document chunks 500, 502, 504). This is shown as action "1".

In some implementations, generating 300 the plurality of chunks includes performing 308 topic extraction on the plurality of text portions of the document. For example, topic extraction is a natural language programming technique that automatically identifies the main topics or themes within a text portion. A machine learning model (not shown) may be employed to analyze text portions of a document and clusters them based on words or phrases to determine underlying patterns. In some implementations, chunk summary generation process 10 uses topic extraction to guide the chunking process of large continuous text blocks of a document.

In some implementations, generating 300 the plurality of chunks includes generating 310 a new chunk in response to detecting a change in topic for a topic extracted from a text portion of the document. For example and upon detection of a topic change, chunk summary generation process 10 may end the current chunk and start a new chunk. This approach creates more "semantically homogenous" text chunks, which are likely to be better candidates for the following stages of query matching and answer generation.

In some implementations, chunk summary generation process 10 generates 302 a plurality of chunk summaries by generating a summary for each respective chunk of the plurality of chunks. For example, a chunk summary is a representation or synopsis of the chunk's content or topic. As shown in FIG. 4, chunk summary generation process 10 provides chunk summaries to provide symmetric searches for a given query. As most queries have a range of input characters, chunk summary generation process 10 generates 302 a chunk summary for a respective chunk by determining a topic or other summary to represent the content of the chunk that has a similar range of characters. For example, chunk summary generation process 10 may generate a summary of each respective chunk with a character limit based on a predefined character limit for a query or other predefined character limit. Referring again to FIG. 5, chunk summary generation process 10 processes the plurality of chunks (e.g., document chunks 500, 502, 504) and generates a plurality of chunk summaries (e.g., chunk summaries 506, 508, 510). This is shown as action "2".

In some implementations, generating 302 the plurality of chunk summaries includes extracting 312 the chunk summary from the document structure. For example, chunk summary generation process 10 identifies a plurality of headings from a document by processing a hierarchical structure associated with the document including the plurality of headings and a plurality of content portions within the plurality of headings. For example and referring also to FIG. 6, a document (e.g., document 402) may generally include a plurality of headings (e.g., headings 600, 602, 604, 606, 608, 610) and associated content portions (e.g., content portions 612, 614, 616, 618, 620, 622). In this example, heading 600 includes sub headings 602, 604 and sub heading 602 includes sub sub heading 606 and sub heading 604 includes sub sub heading 608 and sub sub heading 610. Further, content portion 612 corresponds to heading 600; content portion 614 corresponds to sub heading 602; content portion 616 corresponds to sub heading 604; content portion 618 corresponds to sub sub heading 618; content portion 620 corresponds to sub sub heading 608; and content portion 622 corresponds to sub sub heading 610. In this example, the hierarchical structure is defined using headings, sub headings, sub sub headings, and corresponding content portions. However, it will be appreciated that other hierarchical relationships and dependencies may be used to define a hierarchical structure for document 402 within the scope of the present disclosure.

In some implementations, processing the hierarchical structure associated with the document includes identifying structural elements within the document indicative of hierarchical structure. For example, chunk summary generation process 10 may identify headings by identifying changes in font style and/or size from general text portions. In another example, chunk summary generation process 10 may identify headings by identifying spacing or text indentation within the document that are indicative of hierarchical structure. In another example, chunk summary generation process 10 may identify hierarchical indicators in the form of list numbering, paragraph numbering, evidence of multilevel lists, an alphanumerical character followed by a parenthesis (i.e., ")") or a period (i.e., ".") as in "2." or "3)", etc. In this example, chunk summary generation process 10 uses text recognition to identify these characters and their structural and spatial relationship to identify headings in the document.

In some implementations, chunk summary generation process 10 extracts 312 the chunk summary from the headings, sub headings, and/or sub sub headings. For example, headings may have the fewest number of characters, while sub headings may have a range of characters that is commensurate with the number of characters of a query. In this example, chunk summary generation process 10 extracts 312 the chunk summary from the sub heading(s). In another example, chunk summary generation process 10 extracts 312 the chunk summary from the sub sub heading(s).

In some implementations, generating 302 the plurality of chunk summaries includes performing 314 topic extraction on each chunk to generate the chunk summary. In one example, suppose document 402 includes the following heading "Install a new base enclosure and an optional expansion enclosure" and sub heading "Install a new base enclosure" and sub heading "Installation power overview". In this example, for the sub heading "Install a new base enclosure" chunk summary generation process 10 performs 314 topic extraction (e.g., using a machine learning model or other natural language processing model) and extracts 314 e.g., three topics: "Installing base enclosure"; Optional expansion enclosure"; and "Rack Installation". As will be discussed in greater detail below, chunk summary generation process 10 uses these topics extracted from the chunks to compare against a query for symmetrical searching.

In some implementations, generating 302 the plurality of chunk summaries includes performing 316 chunk summarization using a generative AI model. For example, chunk summary generation process 10 can perform chunk summarization to generate a succinct synopsis of a chunk of document 402. In one example, suppose the following query is received: "What are the Mini-SAS HD cables used for?". The correct answer is found under a section of document 402 within a section under the heading: "Install a SAS expansion enclosure". When applying summarization and using the result of chunk synopsis, chunk summary generation process 10 receives the correct answer for this query, namely: "The Mini-SAS HD cables are used to connect the base enclosure to the expansion enclosure, the expansion enclosure to another expansion enclosure, and to loopback from the expansion enclosure to the base enclosure." Accordingly, chunk summary generation process 10 performs 316 chunk summarization using a generative AI model or other natural language processing model (not shown) to generate chunk summaries for each respective chunk of document 402.

In some implementations, chunk summary generation process 10 generates 304 a plurality of chunk summary embeddings by generating an embedding of the summary for each respective chunk. For example, chunk summary generation process 10 indexes each chunk summary using word embeddings. For example, the Bidirectional Encoder Representations from Transformers (BERT) sentence transformer uses a space of 384 embeddings. In this example, each chunk summary of text is passed through the transformer, and a vector of 384 numbers corresponding to the 384 dimensions is outputted. The resulting chunk summaries and their vector embeddings (e.g., chunk summary embeddings 512) are stored in a database. This is shown as action "3" which completes the preprocessing of input documents and chunk summary embeddings for use during RAG.

In some implementations, chunk summary generation process 10 provides 306 the plurality of chunk summary embeddings for processing a query using the generative AI model. For example, using the plurality of chunks, chunk summary generation process 10 is able to process queries using generative AI model 514 using context from document 402. In some implementations, chunk summary generation process 10 uses plurality of chunks 408 during retrieval augmented generation (RAG) using generative AI model 514. For instance, with plurality of chunk summaries 506, 508, 510 generated from chunks of document 402, chunk summary generation process 10 provides more efficient (i.e., in terms of chunk size) and effective (i.e., in terms of symmetric searches of document 402 for processing prompts with generative AI model 514). In the following example, a query (e.g., query 400) is received for processing using generative AI model 514. Given a user query (e.g., query 400), the query text is likewise transformed into a vector of embeddings (e.g., query embedding 516). This is shown as action "4". The similarity between the query and chunk summaries is determined to find a set of chunk summaries that are most similar (i.e., relevant) to the query. This is done using cosine similarity or a similar algorithm. This matching step can be done efficiently using vector search. This is shown as action "5".

The query and selected chunks are combined into a prompt (e.g., prompt 518) to the LLM (e.g., generative artificial intelligence (AI) model 514). This is shown as action "6". The LLM output (e.g., output 520) is presented to the user. This is shown as action "7". Accordingly, chunk summary generation process 10 enhances the preprocessing of input documents by generating chunk summaries and respective chunk summary embeddings for symmetric searching relative to query 400.

In this example, a standard RAG approach is compared with chunk summary generation process 10. For example, consider a query (e.g., "How to unpack the base enclosure?") based on document 402 which is an installation and service guide for a storage system. Using the conventional standard RAG approach, a prompt is generated using standardized chunks as follows:

Query: How to unpack the base enclosure?

Output: To unpack the base enclosure:

Remove the enclosure from the box and check for any damage.

Unscrew the screws from the back of the enclosure and remove the cover.

Carefully remove the components from the enclosure and check for any damage.

Place the components in a safe place and reassemble the enclosure.

Plug in the power cables and turn on the enclosure.

In the above example, the answer is incorrect, and the source of the error is that the wrong chunk was selected, i.e., the section with heading "Installation power overview" (under the same heading). For example, large chunks with many bits of information make it difficult to achieve a good match between the query and chunks. Now using chunk summary generation process 10, chunk summary generation process 10 generates 318 a query embedding (e.g., query embedding 516) from query 410. Chunk summary generation process 10 identifies 320 a candidate chunk by determining a similarity between the query embedding and the plurality of chunk summary embeddings. In some implementations, the similarity is determined by calculating a cosine similarity between query embedding 516 and plurality of chunk summary embeddings 512. However, it will be appreciated that other comparison algorithms may be used to identify a sufficiently similar respective chunk embedding from plurality of chunk summary embeddings 512 compared to query embedding 516. In some implementations, chunk summary generation process 10 uses a similarity threshold for comparing query embedding 516 and plurality of chunk summary embeddings 512.

In some implementations, chunk summary generation process 10 generates 322 a prompt using the query and the candidate chunk. For example, chunk summary generation process 10 combines query 400 and the respective chunks associated with the similar chunk embeddings from the plurality of chunk summary embeddings 512 to generate prompt 518. As discussed above, the combined prompt is generated using the prompt size limitation for generative AI model 514. In some implementations, chunk summary generation process 10 provides 324 the prompt to the generative AI model. Generative AI model 514 processes prompt 518 to generate an output (e.g., output 520). Continuing with the above example, where topic extraction extracts three topics from document 402 (i.e., "Installing base enclosure"; "Optional expansion enclosure"; "Rack installation". In this example, chunk summary generation process 10 identifies 320 a candidate chunk by determining a similarity between the query embedding and the plurality of chunk summary embeddings by comparing the same query (i.e., "How to unpack the base enclosure?") against the set of chunk summary embeddings in the database of chunk summary embeddings. Accordingly, the correct summary is selected, and the output of generative AI model 512 generated with the matching chunk as input (i.e., context to the prompt) is as follows:

Query: How to unpack the base enclosure?

Output: To unpack the base enclosure:

- Verify that you have received all of the base enclosure components in the shipping package.
- Confirm that you received all necessary equipment needed to install the new base enclosure.
- Lift the enclosure and slide it onto the rails from the front of the cabinet.
- Push the system into the rack until the slam latches engage and lock the system into the rack.
- Ensure that the enclosure is flush with the front of the rack, fully seated in the cabinet, and does not slide out.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
- generating a plurality of chunks for a plurality of text portions of a document, wherein generating the plurality of chunks includes:
- generating a plurality of semantically homogenous chunks by:
  - performing topic extraction on the plurality of text portions of the document, and
  - generating a new chunk in response to detecting a change in topic for a topic extracted from a text portion of the document;
- generating a plurality of chunk summaries by generating a summary for each respective chunk of the plurality of chunks based upon, at least in part, a character limit based on a predefined character limit for a query, wherein generating the plurality of chunk summaries includes extracting the chunk summary from a plurality of headings from the document structure;
- generating a plurality of chunk summary embeddings by generating an embedding of the summary for each respective chunk; and
- providing the plurality of chunk summary embeddings for processing the query using a generative AI model.

2. The computer-implemented method of claim 1, wherein generating the plurality of chunk summaries includes performing topic extraction on each chunk to generate the chunk summary.

3. The computer-implemented method of claim 1, wherein generating the plurality of chunk summaries includes performing chunk summarization using a generative AI model.

4. The computer-implemented method of claim 1, further comprising:
- generating a query embedding from the query;
- identifying a candidate chunk by determining a similarity between the query embedding and the plurality of chunk summary embeddings;
- generating a prompt using the query and the candidate chunk; and
- providing the prompt to the generative AI model.

5. A computer program product residing on a non-transitory computer readable medium having a plurality of instructions stored thereon which, when executed by a processor, cause the processor to perform operations comprising:
- generating a plurality of chunks for a plurality of text portions of a document, wherein generating the plurality of chunks includes generating a plurality of semantically homogenous chunks by:
  - performing topic extraction on the plurality of text portions of the document, and
  - generating a new chunk in response to detecting a change in topic for a topic extracted from a text portion of the document;
- generating a plurality of chunk summaries by generating a summary for each respective chunk of the plurality of chunks based upon, at least in part, a character limit based on a predefined character limit for a query, wherein generating the plurality of chunk summaries includes extracting the chunk summary from a plurality of headings from the document structure;
- generating a plurality of chunk summary embeddings by generating an embedding of the summary for each respective chunk; and
- providing the plurality of chunk summary embeddings for processing the query using a generative AI model.

6. The computer program product of claim 5, wherein generating the plurality of chunk summaries includes performing topic extraction on each chunk to generate the chunk summary.

7. The computer program product of claim 5, wherein generating the plurality of chunk summaries includes performing chunk summarization using a generative AI model.

8. The computer program product of claim 5, wherein the operations further comprise:
- generating a query embedding from the query;
- identifying a candidate chunk by determining a similarity between the query embedding and the plurality of chunk summary embeddings;
- generating a prompt using the query and the candidate chunk; and
- providing the prompt to the generative AI model.

9. A computing system comprising:
- a memory; and
- a processor configured to generate a plurality of chunks for a plurality of text portions of a document, wherein generating the plurality of chunks includes generating a plurality of semantically homogenous chunks by: performing topic extraction on the plurality of text portions of the document, and generating a new chunk in response to detecting a change in topic for a topic extracted from a text portion of the document, to generate a plurality of chunk summaries by generating a summary for each respective chunk of the plurality of chunks based upon, at least in part, a character limit based on a predefined character limit for a query, wherein generating the plurality of chunk summaries includes extracting the chunk summary from a plurality of headings from the document structure, to generate a plurality of chunk summary embeddings by generating an embedding of the summary for each respective chunk, and to provide the plurality of chunk summary embeddings for processing a query using a generative AI model.

10. The computing system of claim 9, wherein generating the plurality of chunk summaries includes performing topic extraction on each chunk to generate the chunk summary.

11. The computing system of claim 9, wherein generating the plurality of chunk summaries includes performing chunk summarization using a generative AI model.

12. The computing system of claim 9, wherein the processor is further configured to:

generate a query embedding from the query;

identify a candidate chunk by determining a similarity between the query embedding and the plurality of chunk summary embeddings;

generate a prompt using the query and the candidate chunk; and provide the prompt to the generative AI model.

* * * * *